US010604072B2

(12) United States Patent
Honghalli Devaraju

(10) Patent No.: US 10,604,072 B2
(45) Date of Patent: Mar. 31, 2020

(54) EARLY REAR VIEW CAMERA VIDEO DISPLAY IN A MULTIPROCESSOR ARCHITECTURE

(71) Applicant: Continental Automotive GmbH, Hannover (DE)

(72) Inventor: Anil Kumar Honghalli Devaraju, Singapore (SG)

(73) Assignee: Continental Automotive GmbH, Hannover (DE)

(*) Notice: Subject to any disclaimer, the term of this patent is extended or adjusted under 35 U.S.C. 154(b) by 140 days.

(21) Appl. No.: 15/300,922

(22) PCT Filed: Apr. 2, 2014

(86) PCT No.: PCT/IB2014/060374
§ 371 (c)(1),
(2) Date: Sep. 30, 2016

(87) PCT Pub. No.: WO2015/150871
PCT Pub. Date: Oct. 8, 2015

(65) Prior Publication Data
US 2017/0015246 A1    Jan. 19, 2017

(51) Int. Cl.
*B60R 1/00* (2006.01)
*G06F 9/4401* (2018.01)
(Continued)

(52) U.S. Cl.
CPC .............. *B60R 1/00* (2013.01); *G06F 9/4401* (2013.01); *G06F 9/4411* (2013.01);
(Continued)

(58) Field of Classification Search
CPC ...................................................... B60R 1/00
See application file for complete search history.

(56) References Cited

U.S. PATENT DOCUMENTS

2001/0020202 A1    9/2001  Obradovich et al.
2007/0086624 A1    4/2007  Breed et al.
(Continued)

FOREIGN PATENT DOCUMENTS

CN        101276286 A      10/2008
CN        201268289 Y       7/2009
(Continued)

OTHER PUBLICATIONS

Extended Search Report dated Nov. 3, 2017 for corresponding European Patent Application No. 14887773.1.
(Continued)

*Primary Examiner* — Rowina J Cattungal

(57) ABSTRACT

An infotainment assembly for a vehicle has a vehicle communication controller and a multimedia controller with an interchip communication bus and a serial bus connection, a message processing unit and a remote messaging interface having a one-way protocol. The multimedia controller comprises a display connection for a display device, a message receiver, and a computer readable memory with an operating system having multiple boot phases, wherein graphics drivers of the operating system for controlling the display device are loaded in a later boot phase of the operating system. A video driver retrieves video signals, generates video images and transmits the video images to a display device during an earlier boot phase of the operating system.

19 Claims, 10 Drawing Sheets

Figure 1:
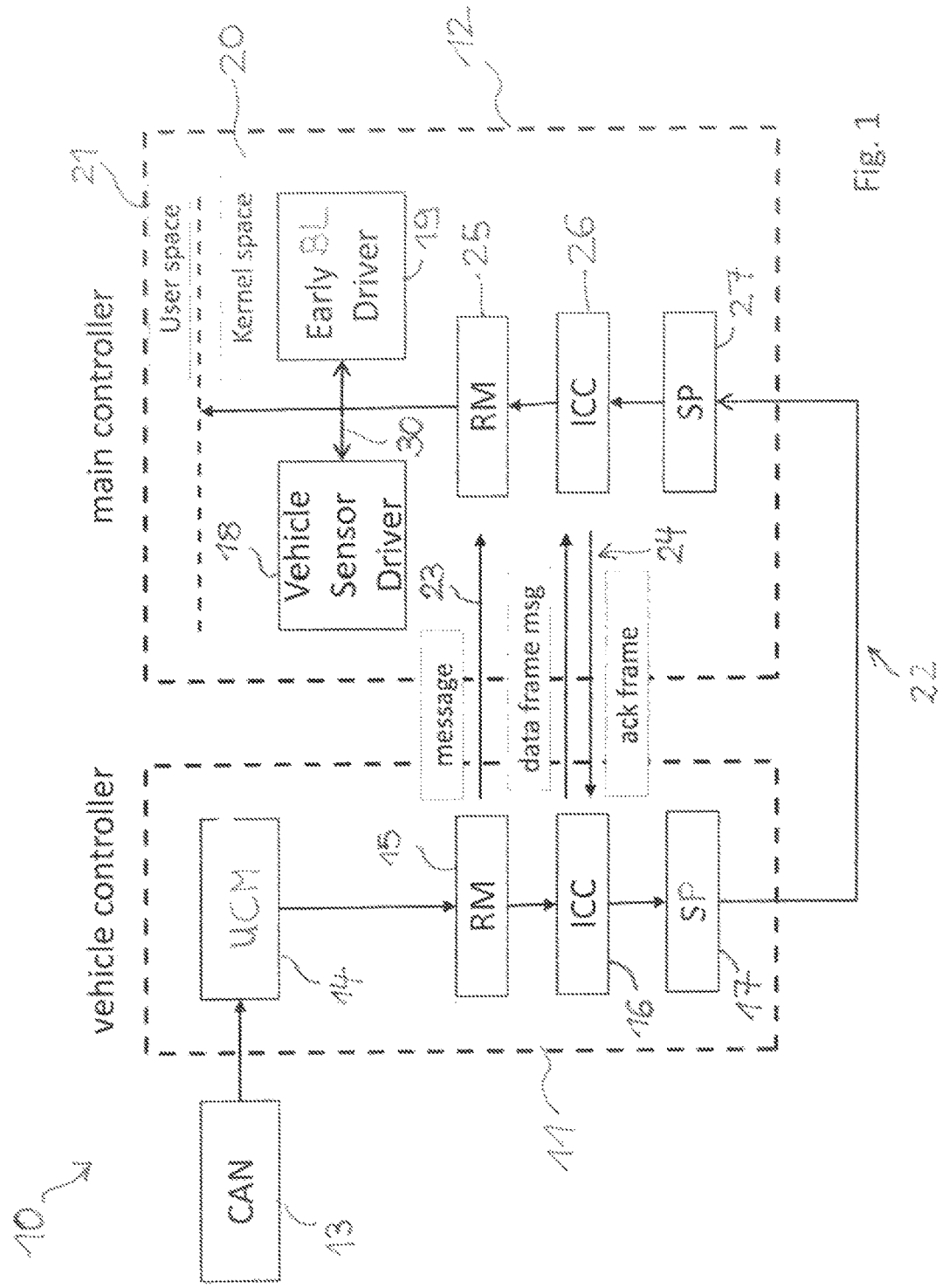

(51) Int. Cl.
   *G06F 13/42*    (2006.01)
   *H04L 12/40*    (2006.01)
   *H04N 7/18*     (2006.01)

(52) U.S. Cl.
   CPC .... *G06F 13/4282* (2013.01); *H04L 12/40013* (2013.01); *H04N 7/183* (2013.01); *B60R 2300/207* (2013.01); *B60R 2300/8046* (2013.01); *H04L 2012/40215* (2013.01); *H04L 2012/40234* (2013.01); *H04L 2012/40273* (2013.01)

(56) References Cited

U.S. PATENT DOCUMENTS

| | | | |
|---|---|---|---|
| 2007/0198144 A1* | 8/2007 | Norris | B60T 7/22 |
| | | | 701/23 |
| 2012/0011351 A1* | 1/2012 | Mundra | G06F 21/72 |
| | | | 713/1 |
| 2012/0078440 A1* | 3/2012 | Oravis | B60R 1/00 |
| | | | 701/1 |
| 2013/0030645 A1 | 1/2013 | Divine et al. | |
| 2013/0054945 A1 | 2/2013 | Free et al. | |
| 2013/0345898 A1* | 12/2013 | Park | G06F 9/54 |
| | | | 701/1 |
| 2014/0223158 A1* | 8/2014 | Zhou | G06F 9/4405 |
| | | | 713/2 |
| 2014/0232870 A1* | 8/2014 | Mondal | H04N 7/01 |
| | | | 348/148 |
| 2014/0368653 A1* | 12/2014 | Wang | G06F 13/24 |
| | | | 348/148 |
| 2015/0249602 A1* | 9/2015 | Barner | H04L 45/72 |
| | | | 370/389 |

FOREIGN PATENT DOCUMENTS

| | | |
|---|---|---|
| CN | 101704353 A | 5/2010 |
| EP | 1975790 A2 | 1/2008 |
| EP | 2213518 A1 | 8/2010 |
| WO | 2005122129 A1 | 12/2005 |
| WO | 2009-038839 A1 | 3/2009 |

OTHER PUBLICATIONS

International Search Report and Written Opinion dated Dec. 26, 2014 from corresponding International Patent Application No. PCT/IB2014/060374.

* cited by examiner

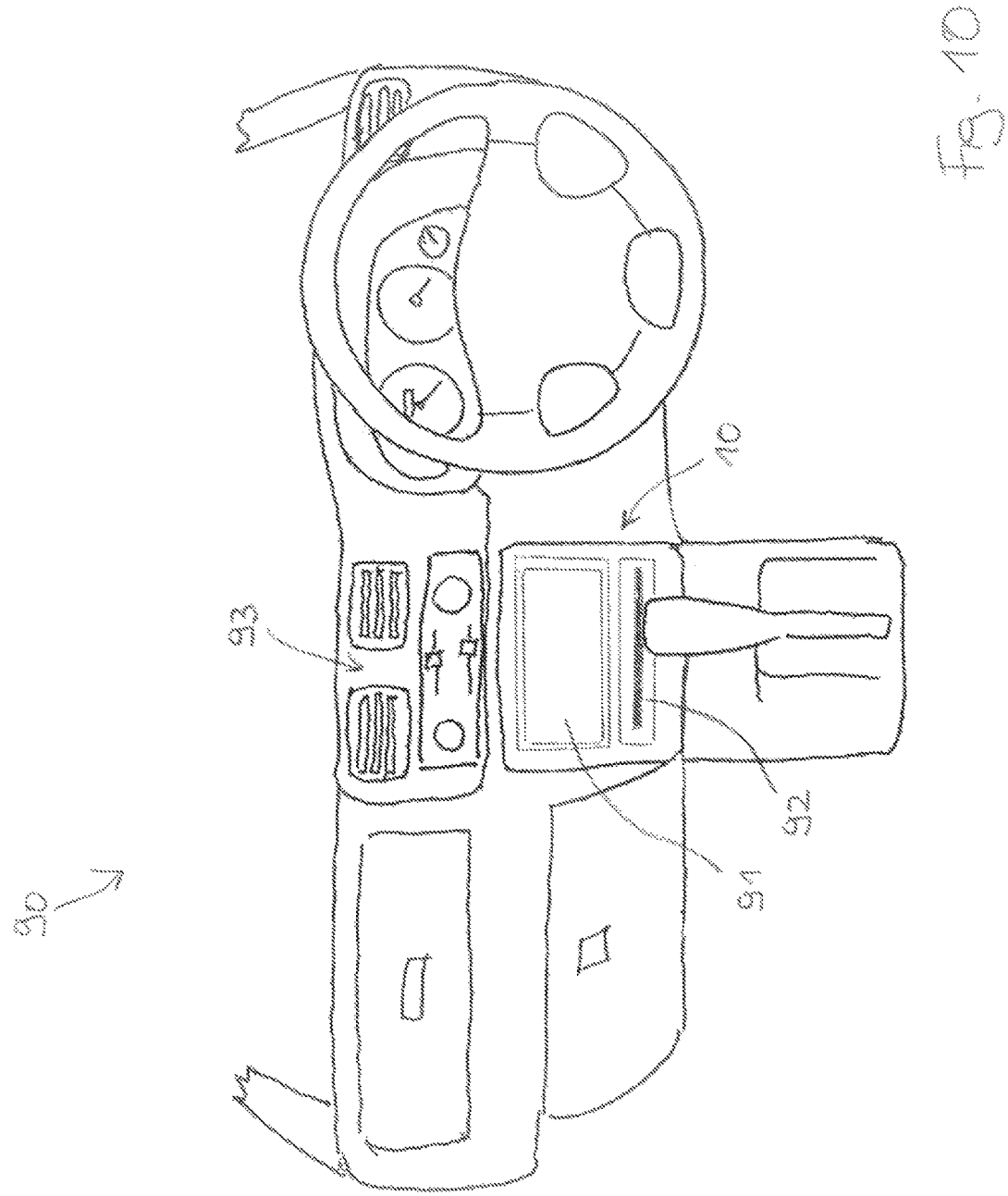

EARLY REAR VIEW CAMERA VIDEO DISPLAY IN A MULTIPROCESSOR ARCHITECTURE

This application relates to a rear view camera video display.

In order to enhance driver and/or passenger experience, passenger vehicles may be provided with hardware or software products and systems, which are built into, or can be added to the vehicle. A vehicle system that unites car radio and entertainment, navigation system, hands-free equipment, driver assistance and other functionality is also referred to as "infotainment system". In the past, infotainment systems had been offered mainly for luxury and medium-class vehicles but recently they are becoming more common in lower-class vehicles as well.

Different from a car-computer having display functions in the driver's display, which indicate the car's health state and other related information, an infotainment system often comprises a large display in the centre console of the car. Thereby, a co-driver is able to operate it as well.

A car infotainment system typically comprises a head unit with mainboards having a CPU and SDRAM components. Furthermore, digital signal processors (DSPs) or a field programmable gate array (FPGA) are often used for audio processing, mp3 image decoding and graphics processing. The speedometer and further car components are connected to a controller area network (CAN) bus. Further audio components, such as the CD changer or the amplifier, are connected via a media oriented systems transport (MOST) bus. Other bus systems that may be connected to the infotainment system include the local interconnect network (LIN) bus and the Flexray bus.

The majority of the infotainments system on the market is designed using more than one controller for using a real time operating system to implement hard real time functionalities and features such as a human machine interface, media and phone, which requires a system on chip with a high end microprocessor and operating system.

It is an object of the application to provide an improved rear view camera video display.

Among others, the current specification discloses an infotainment assembly for a car, comprising a vehicle communication controller (VUC) and a multimedia controller (MMU), which are connected by an interchip communication bus. The infotainment assembly may be packaged and sold together in a compact unit, the unit having an input connection for a power supply and for a CAN bus and output connections for peripheral devices such as a display device.

The vehicle communication controller refers to a controller for managing, among others, power management and CAN communication and the multimedia controller refers to a controller for managing media play back, the human machine interface and further functions.

The vehicle communication controller comprises a bus connection, especially a bus connection for connecting a serial bus, especially a CAN bus of the vehicle and in particular a low speed CAN bus. Furthermore, the vehicle communication controller comprises a message processing unit, which is also referred to as rear view camera trigger business logic or "RVC trigger BL", and a remote messaging interface, also referred to as message dispatcher, for sending out messages using a one-way protocol. The one-way protocol is implemented on top of an interchip communication protocol such as the CAN bus.

The multimedia controller is connected to the vehicle communication controller via an interchip communication bus. Furthermore, the multimedia controller comprises a display connection for connecting a display device of the vehicle. By way of example, the display connection may be provided by a CVBS/S-video output which uses a low voltage differential signaling (LVDS).

Furthermore, the multimedia controller comprises a message receiver for receiving messages from the vehicle communication controller according to the one-way protocol. By way of example, the message receiver may be configured to periodically read out a dedicated memory location to which messages from the vehicle communication controller are written. The message receiver may be realized in software, hardware or a combination thereof.

Moreover, the multimedia controller comprises a computer readable memory with an operating system, such as a Windows embedded or a Linux embedded operating system. The memory may be provided as part of the multimedia controller or as a memory which a part of the infotainment assembly but external to the multimedia controller. In the latter case, the operating system is loaded or copied into a memory of the multimedia controller during start-up of the multimedia controller.

The operating system provides multiple boot phases for the multimedia controller. In a later boot phase of the operating system, one or more graphics drivers of the operating system for controlling the display device are loaded into a computer readable memory. In particular, the driver may be provided as a Windows shared library or DLL which can be loaded via the operating system functions "LoadLibary" or "LoadDriver".

In the context of a Windows OS, drivers can be categorized into native drivers and stream drivers. Native drivers typically support input and output peripherals, such as display drivers, keyboard drivers, and touch screen drivers. The Graphics, Windowing, and Events Subsystem (GWES) loads and manages these drivers directly. Native drivers are usually provided by an original equipment manufacturer and implement specific functions according to their purpose, which the GWES can determine by calling the GetProcAddressAPI. Stream drivers, on the other hand, expose a well-known set of functions that resemble file system operations and that enable the Device Manager to load and manage these drivers.

The multimedia controller comprises a video driver which is loaded by the operating system in the later boot phase. A marker, such as a registry entry indicates to the operating system to load the video driver as a first driver in the later boot phase. A further marker indicates to the operating system to load the video driver into a kernel space of the operating system.

Furthermore, the multimedia controller comprises an early business logic which is operative to cause the video driver to start a rear view camera video.

The video driver is loaded into a kernel space. Under the Windows CE OS, the Drivers loaded by the Graphics, Windows and event (GWES) and the FileSys subsystem are examples of kernel mode drivers which are loaded into the kernel space.

By contrast, a user mode driver is loaded into the memory of a specialized user process, such as the "Udevice.exe". Under Windows CE, the user space has limitations compared to the kernel space in that
 the kernel structure and the kernel memory are not accessible,
 a large part of the kernel API is not available,
 the use of the available part of the kernel API is restricted by registry settings, access to user buffers is limited. Which servers are to be loaded into kernel or user space is determined by markers such as registry settings or file entries. So called universal drivers have the ability to be loaded in both the kernel space and the user space.

Among others, the video driver is operative to retrieve video signals from a video input of the multimedia controller, to generate video images from the video signals and for transmitting the video images to a display buffer of a display device thereby causing the video images to be displayed.

In particular, the multimedia controller may have a multiprocessor architecture, wherein one processor/media control unit (MCU) is dedicated to run the video driver. It may even comprise separate processors for handling image transformations, for 2D rendering, for 3D rendering, also referred to as graphics processing units (GPUs), and for video processing, also referred to as video processing unit (VPU).

The operating system is configured to load the early business logic driver during an earlier boot phase of the operating system, which precedes the later boot phase, and to load the video driver during the later boot phase of the operating system. The early business logic driver is provided, among others, to access the video driver before a RVC application is ready. Furthermore, it is provided to receive remote messaging interface events or messages, and to update a rear view camera state accordingly, in particular during the earlier boot phase.

The early business logic driver is operative to wait for a remote messaging event, such as a gear change event, from the vehicle communication controller via the one-way protocol and to detect whether the video driver is loaded at the time when the gear change event is received. In this case the video driver is activated if the video driver if it is loaded. Activation in this context means that a routine is called for displaying the video signals of a rear view camera on a display screen of the display device.

According to one embodiment, the early business logic spawns a thread in an initialization function "Init( )" of the early business logic which waits for the remote messaging interface event.

In particular, the gear change event may indicate a change from a park position or from a neutral position to a reverse gear position. In this situation, a display of video images from the rear view camera is particularly helpful to the driver.

The early business logic is provided, among others, for calling the video driver before the rear view camera application is ready.

In a further embodiment, a handover unit is operative to receive a message which indicates that the rear view camera application is ready and to discontinue communication between the early business logic and the video driver and to establish communication between the rear view camera application and the video driver. The rear view camera application provides an extended functionality as compared to the early business logic driver.

By way of example, the handover unit may be provided by the early business logic driver, which detects when the rear view camera application is ready. In another embodiment, the handover unit is provided by an initialization routine of the RVC application. By way of example, it may be detected that the rear view camera application is ready by using a flag or by signals that indicate that the operating system has loaded the rear view camera application. The early business logic is notified by the rear view camera application when it is loaded by operating system.

According to a further embodiment, the vehicle communication controller comprises a mechanism to avoid losing messages from the rear view camera. By way of example, messages may be lost by buffer overflow or by being overwritten by higher priority messages due to real time requirements of the serial bus.

In particular, the vehicle communication controller comprises a CAN application for sending CAN messages in periodic intervals and a CAN message mailbox unit for storing messages of the CAN application. The message mailbox unit sends a feedback message indicating whether the CAN message mailbox unit is full. This is the case when a predetermined memory size has been filled such that the message box can no longer accept messages. The CAN application is operative to retry the sending a message if it receives a feedback message indication that the CAN message mailbox is full.

According to a further embodiment, the abovementioned message processing unit is operative to evaluate CAN messages and to trigger rear view camera events and the vehicle communication controller comprises an event messages mailbox unit. The event message mailbox unit stores event messages of the message processing unit of claim 1 and sends a feedback message to the message processing unit or to the rear view camera trigger business logic indicating whether the mailbox unit is full.

Furthermore, the rear view camera trigger business logic is operative to retry sending a message if it receives a feedback message indication that the event messages mailbox is full.

According to a further embodiment, the vehicle communications controller of the infotainment assembly comprises a message dispatcher for sending event messages from the vehicle communication controller to the multimedia controller via a one-way protocol. The message dispatcher unit is connected to an output of the event messages mailbox. This means that the message dispatcher unit receives or retrieves messages from the event messages mailbox.

Furthermore, the current specification discloses an infotainment system of a car with the abovementioned infotainment assembly according. The infotainment system comprises a display device with a display screen that is connected to the display connection or to the video output of the multimedia controller.

Moreover, the current specification discloses a car with the aforementioned infotainment system. A CAN bus of the car is connected to the bus connection of the vehicle communication controller of the infotainment assembly.

In a further aspect, the current specification discloses a method for displaying a rear view camera video images on a screen of a display device of a car infotainment system, wherein the multimedia controller comprises an operating system with multiple boot phases.

During an early boot phase of the operating system, the operating system loads an early business logic driver into a kernel space. The early business logic waits for a rear view camera state event, such as a gear change event, from a vehicle communication controller and determines if the kernel mode video driver is loaded.

If the kernel mode video driver is not loaded, a rear view camera state flag is updated. If the kernel mode video driver is loaded, a function of the kernel mode video driver is called for displaying a video and in particular for retrieving and displaying rear view camera video images. The display may be subject to conditions such as a gear change event.

Furthermore, the current specification discloses a method for handing over control from an early business logic that runs during an earlier boot phase of an operating system with multiple boot phases to a kernel space video driver for displaying a video in a later boot phase of the operating system. The handover takes place from the early business logic to the rear view camera application. When the rear view camera application gets loaded it will inform early business logic. After that the early business logic will handover functionalities to the rear view camera application.

According to the present specification, the video driver can be activated early in a later phase of the operating system before a rear view camera application is ready and even before other drivers are loaded.

Preferably, the video driver is loaded as the first driver in the later boot phase. An Init( ) function of the video driver checks if the rear view camera (RVC) state flag is set. The RVC state flag determines whether an early video display is required. If the RVC state flag is set, the video driver starts to display a video, in particular it starts to display images from a rear view camera. Otherwise, the Init( ) function optionally performs other initialization steps and terminates, such that other drivers can be loaded.

In one embodiment, the video driver comprises instructions to start a thread for starting the video display wherein the tread is assigned a priority above normal to achieve a fast start of the video display. According a further embodiment, the thread is assigned to a special purpose video graphics processor for fast display.

When the rear view camera application is ready, the control of the video driver is handed over or transferred from the early business logic, which is already loaded during an earlier boot phase of the operating system, to the rear view camera application. Thereby, the same video driver can be used by the early business logic and by the rear view camera application.

During the handover, a communication between the kernel space video driver and an early business logic application is discontinued and handed over to the RVC application, which is also referred to as rear view camera business logic. The video driver can be used by getting a handler to the drive, for example, by handing over a pointer to a memory location of the video driver to the rear view camera business logic of the later boot phase.

Accordingly, the present specification discloses a method for handing over control of a kernel mode video driver from a kernel mode early business logic to a rear view camera application during a later boot phase of an operating system with multiple boot phases, the method comprising The early business logic waits for an event indicating that a rear view camera business logic is ready. A rear view camera application is loaded into a user space of the operating system. If the RVC business logic is ready, a communication between the kernel mode or kernel space video driver and the early business logic application is discontinued and a communication between the rear view camera application and the kernel space video driver is established.

Specifically, the early business logic may be implemented as a driver and in particular as a kernel mode driver and the RVC application may also be implemented as a driver and in particular as a user mode driver.

Furthermore, the current specification discloses a method for generating rear view camera events from CAN messages.

The CAN messages are filtered for rear view camera messages, and rear view camera events are generated from the filtered CAN messages. The rear view camera events are stored in a mailbox, wherein a feedback message is sent if the mailbox is full. A rear view camera event is resent upon receiving a feedback message indicating that the mailbox is full.

In particular, the CAN messages and the rear view camera events may be sent periodically via a one-way protocol which is based on or implemented on top of an interchip communication protocol.

Figure 2:
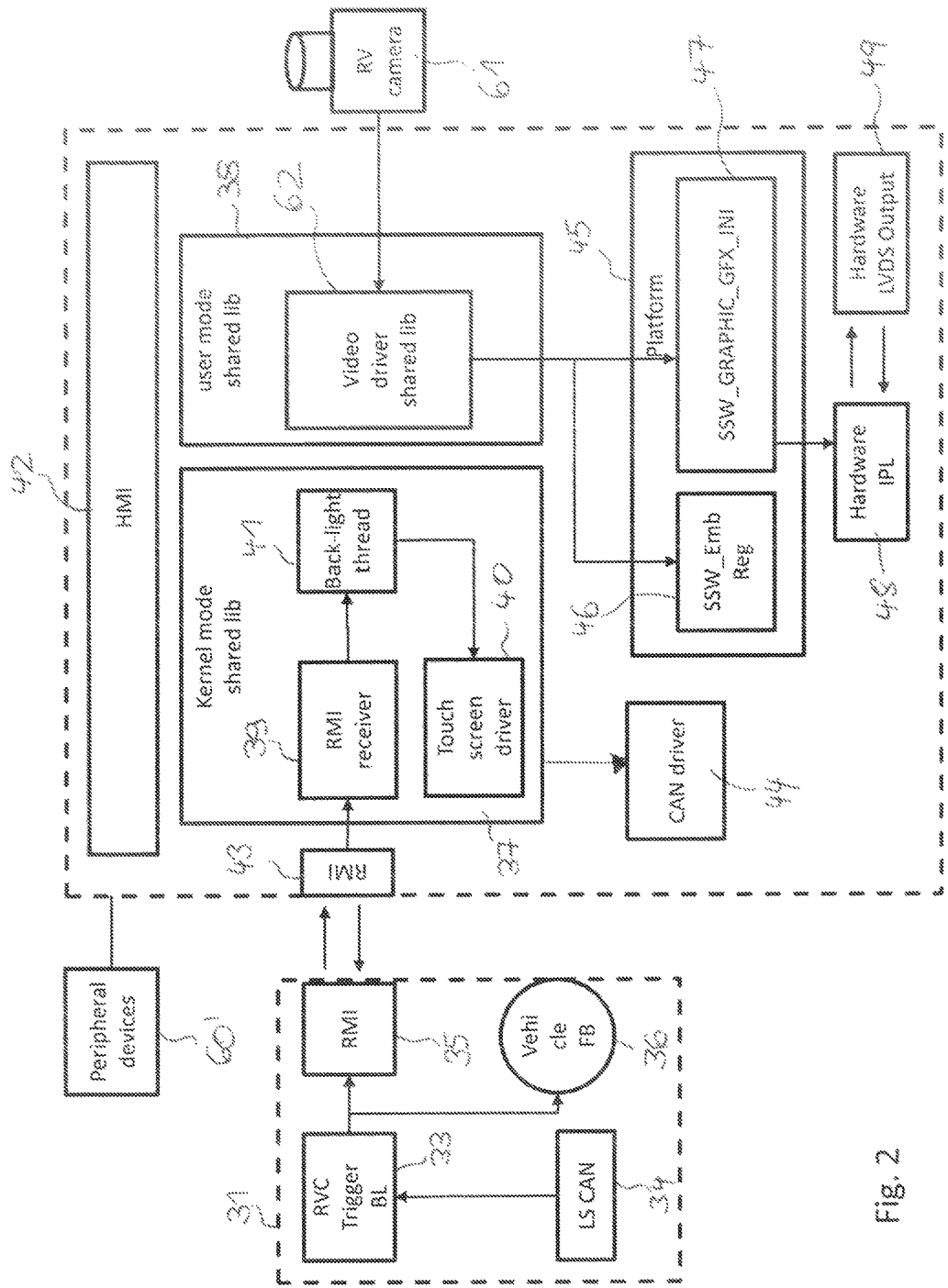
Figure 3:
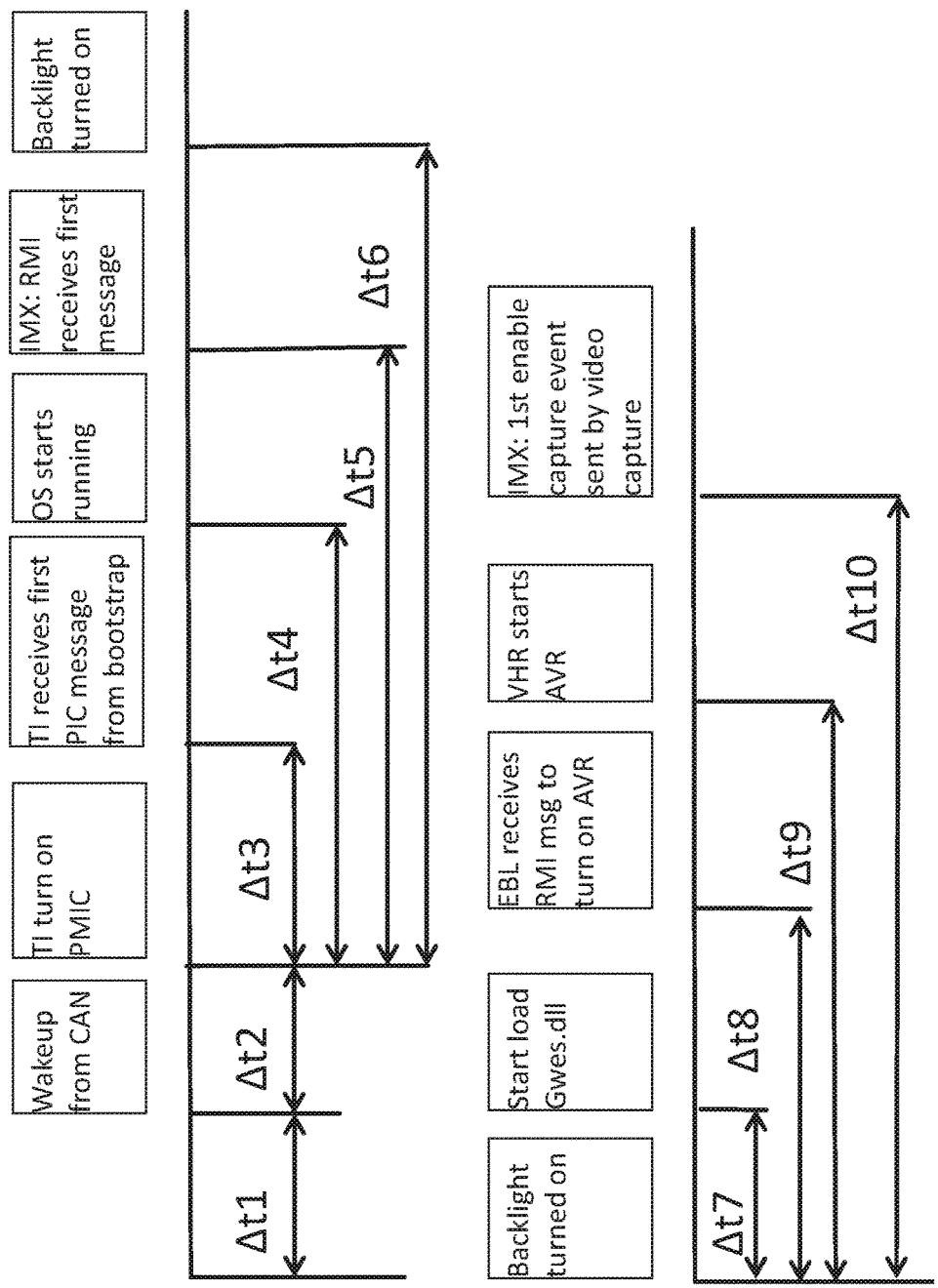
Figure 4:
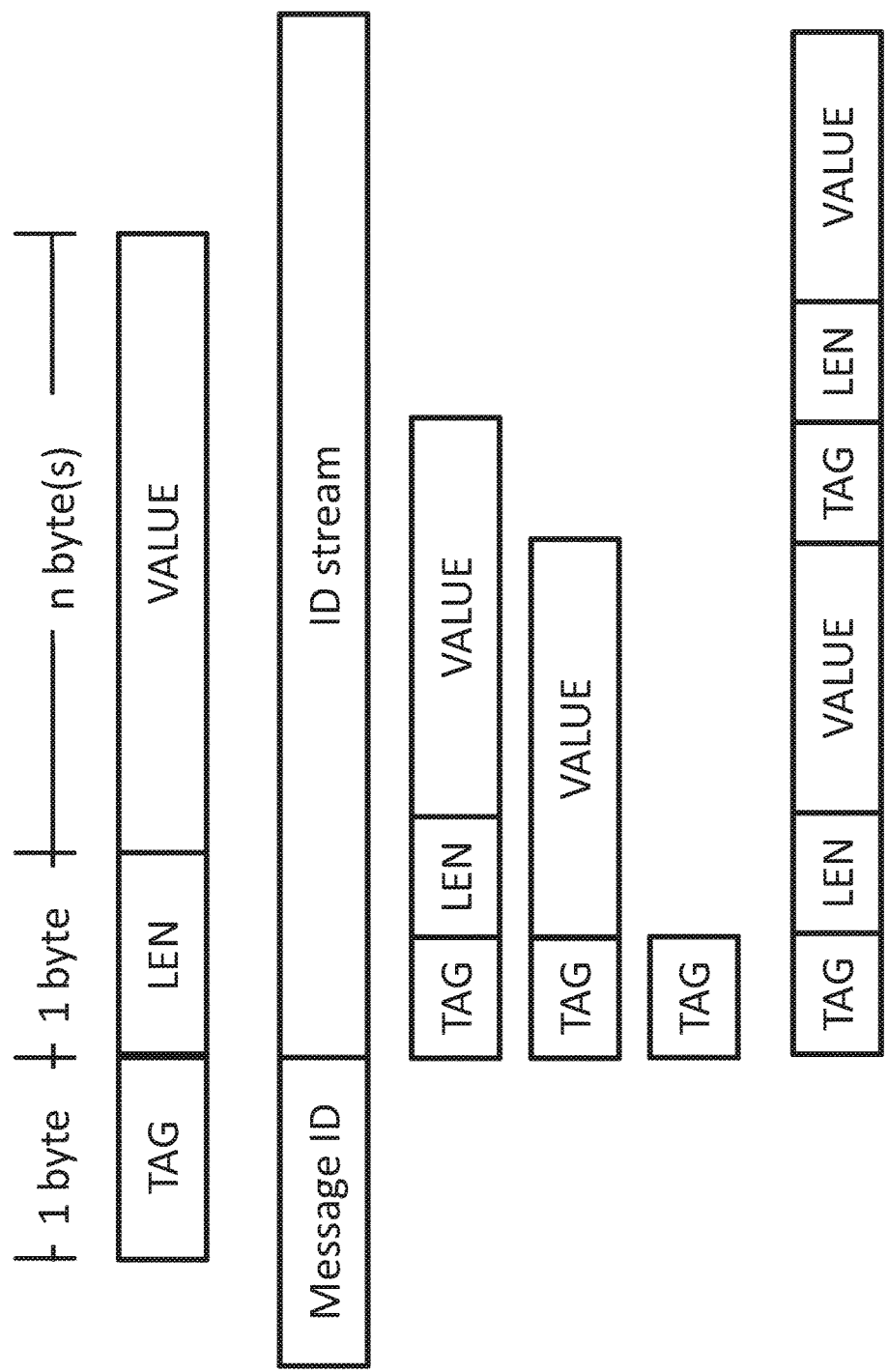
Figure 5:
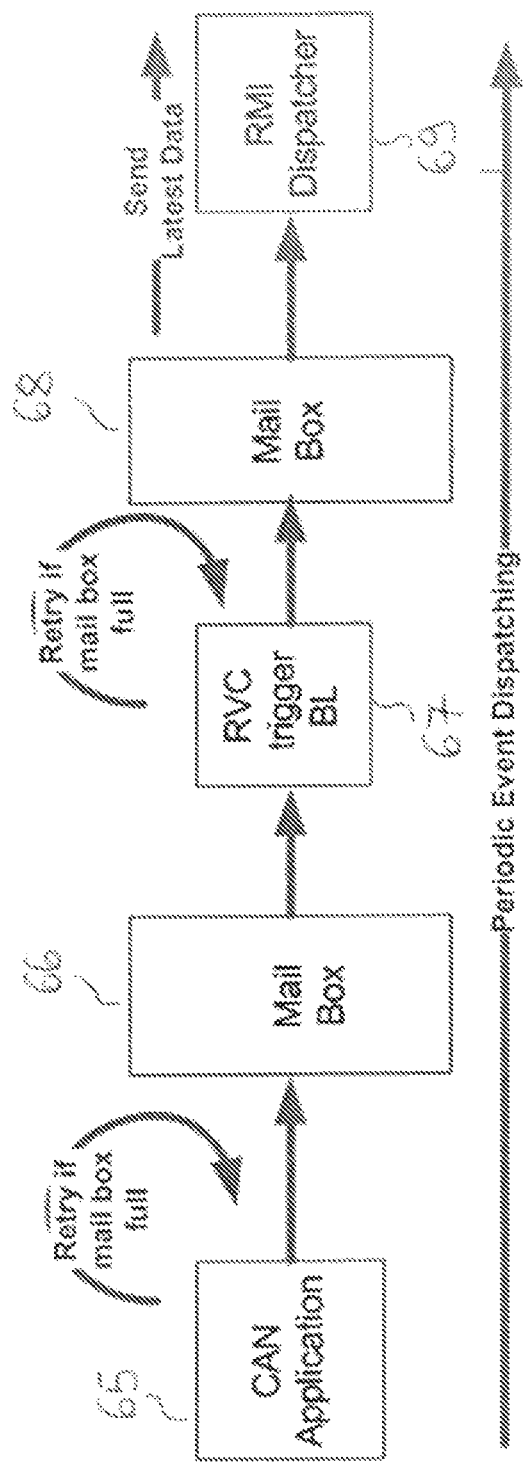
Figure 6:
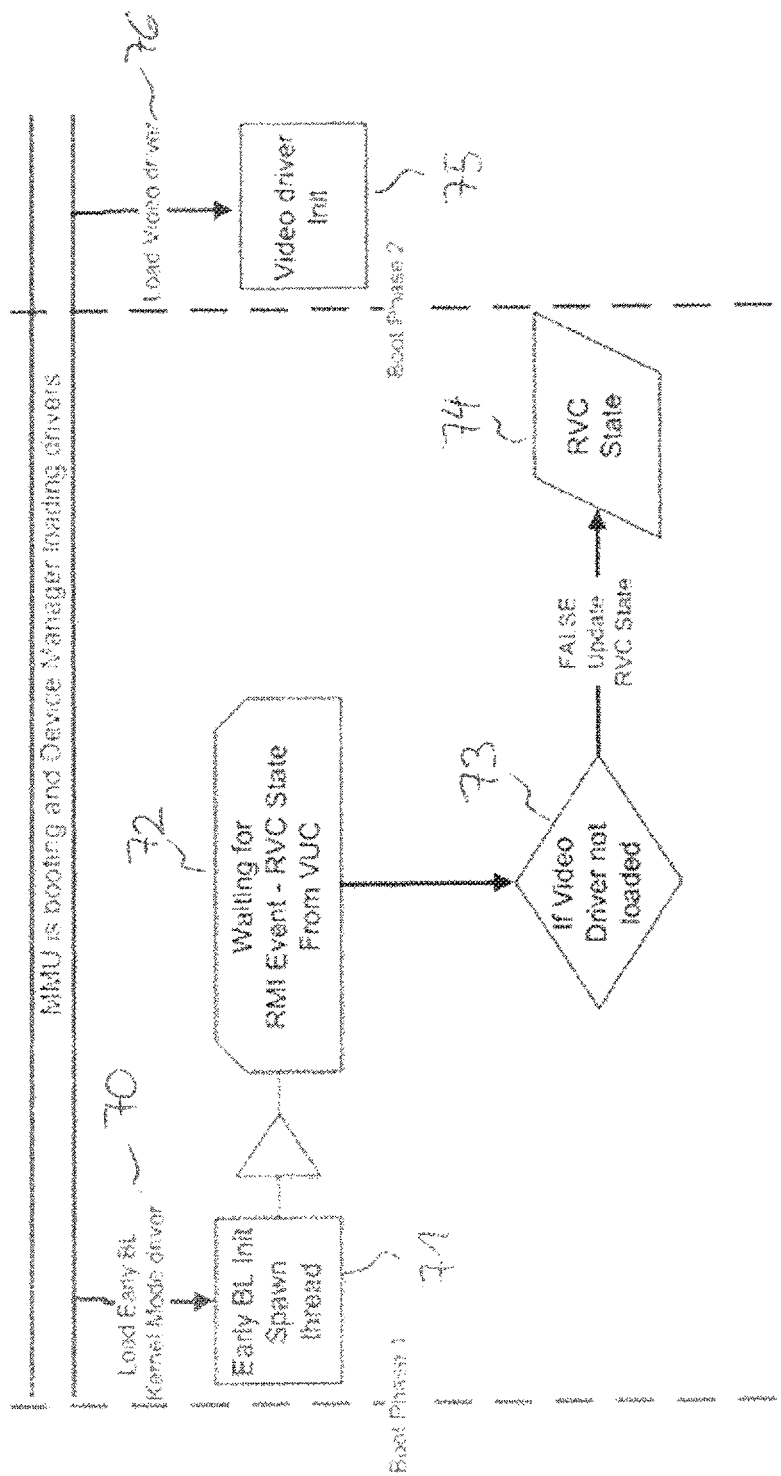
Figure 7:
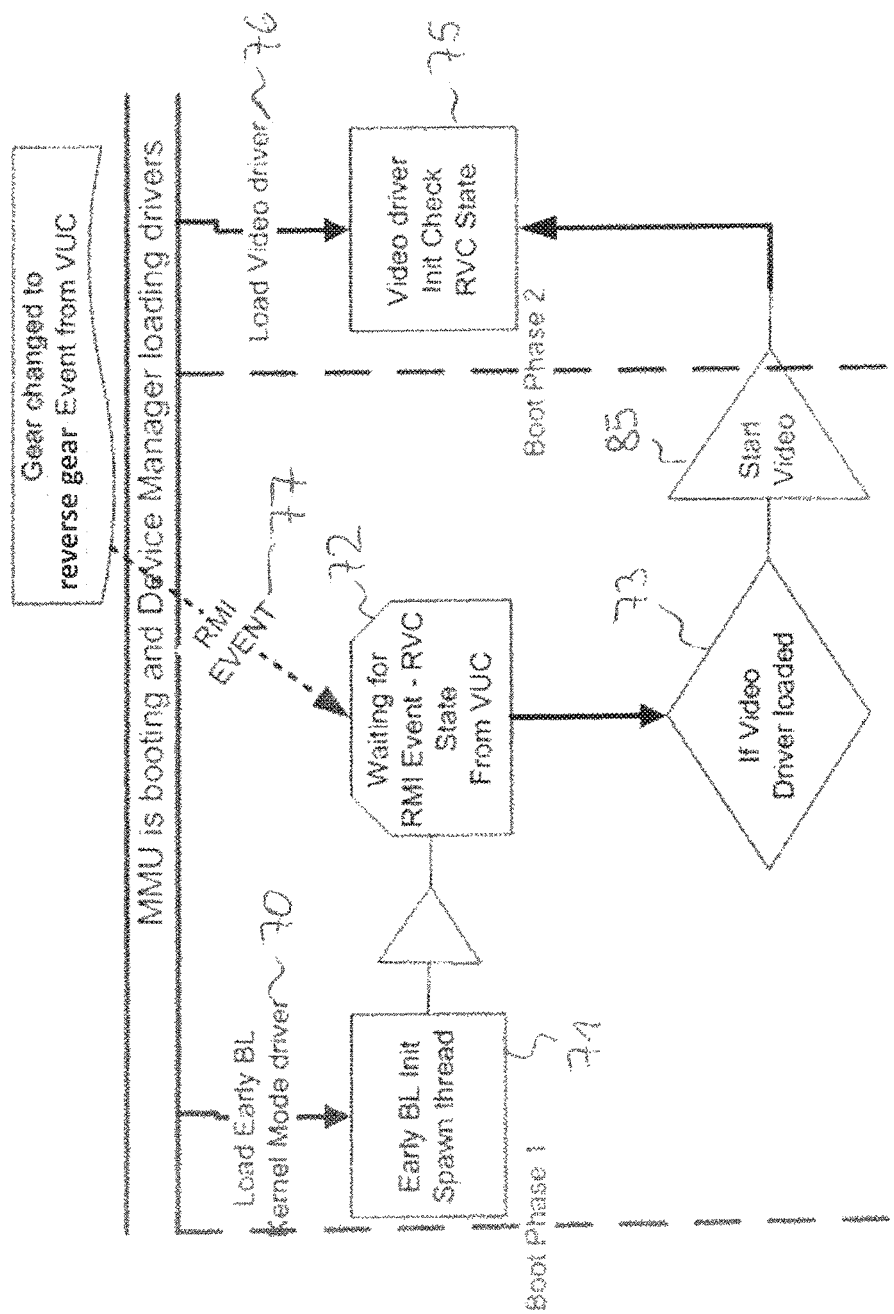
Figure 8:
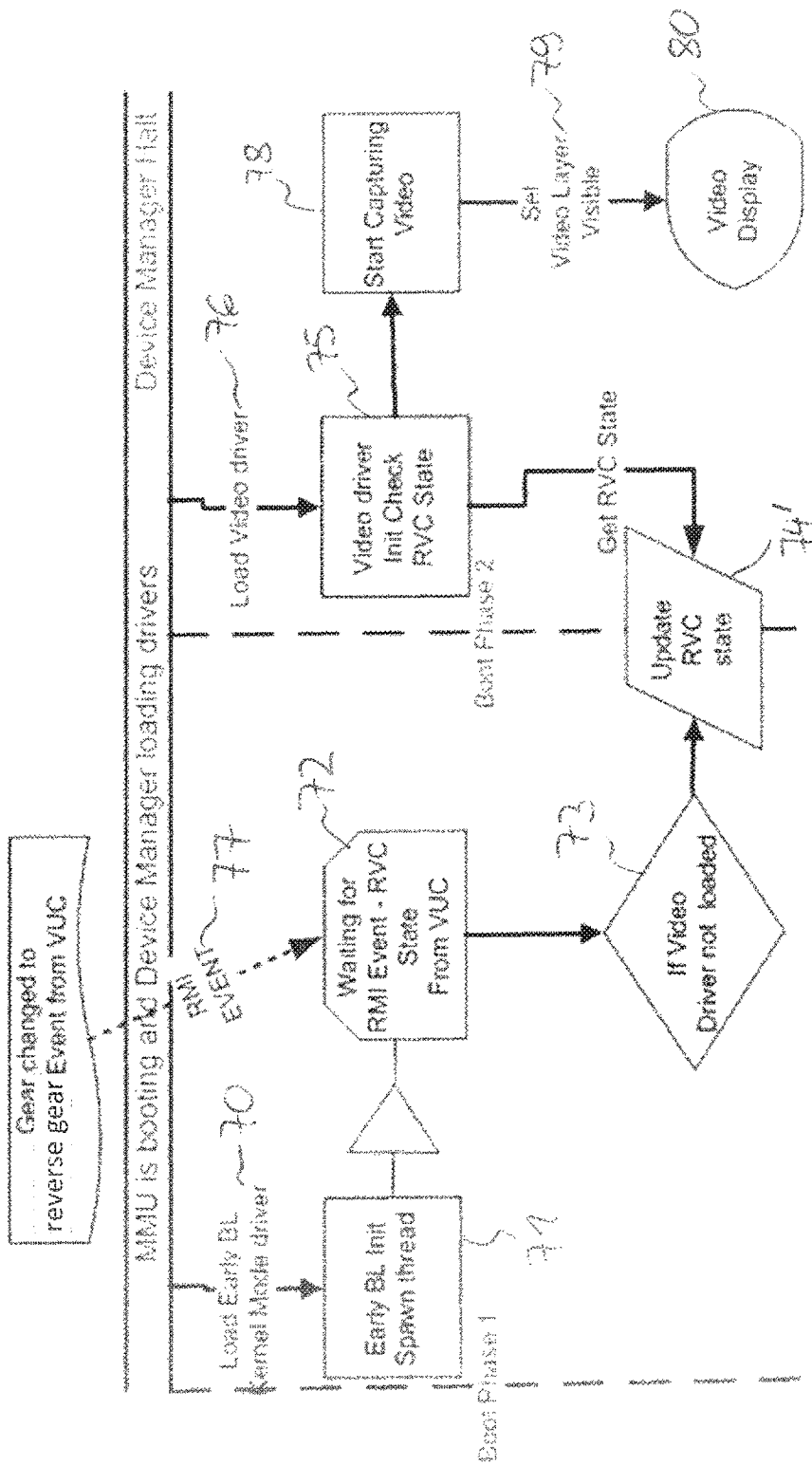
Figure 9:
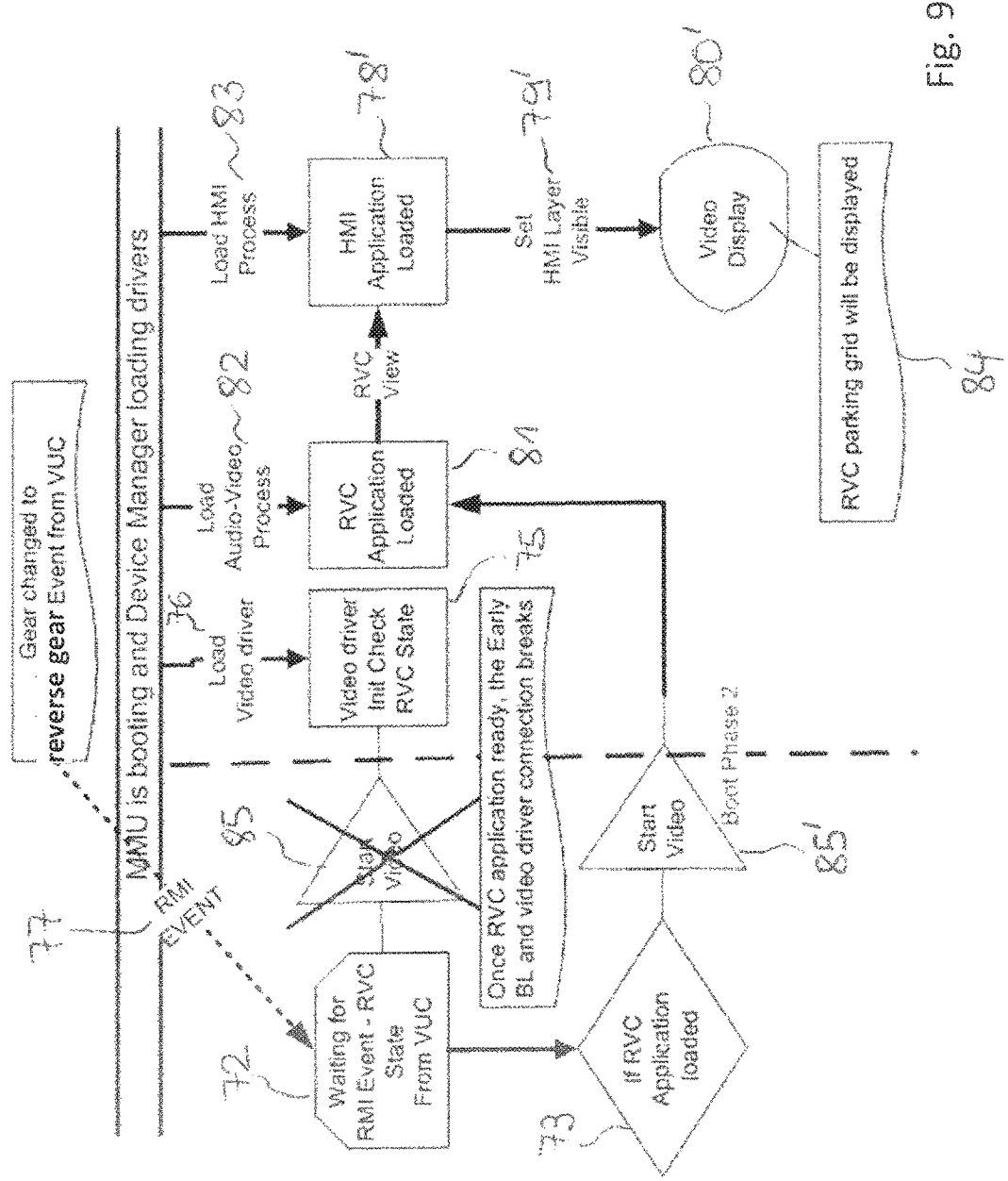

The subject of the current specification is now explained with reference to the following Figs. in which FIG. 1 shows a layout of a car infotainment system and of a vehicle electronic, FIG. 2 shows further details of the infotainment system of FIG. 1, FIG. 3 shows a time sequence during a start-up procedure of the infotainment system of FIG. 1, FIG. 4 shows a message format of messages between a vehicle communication controller and a multimedia controller of the infotainment system of FIG. 1, and FIG. 5 shows a mechanism to avoid lost messages in the RMI protocol of FIG. 4, FIG. 6 shows a first sequence in which a video driver is loaded in a second boot phase of the OS that runs on the multimedia controller of FIG. 2, FIG. 7 shows a second sequence in which a video driver is loaded in a first boot phase of the OS, FIG. 8 shows a transition to a video display in the second boot phase after the sequence of FIG. 6, FIG. 9 shows a transition to a video display in the second boot phase after the sequence of FIG. 7, and FIG. 10 shows a passenger compartment with the infotainment system of FIG. 1.

In the following description, details are provided to describe the embodiments of the present specification. It shall be apparent to one skilled in the art, however, that the embodiments may be practised without such details.

FIG. 1 shows a layout of a car's infotainment system 10, which is connected to vehicle electronics 9. The infotainment system 10 comprises a main controller 12 and further components that are not shown in FIG. 1 such as a display, a car radio, a CD player, a digital signal processor (DSP), a hands-free equipment.

The car electronics 9 comprises a vehicle communication controller 11, a CAN bus 13 and further components which are not shown in FIG. 1, such as an engine control unit, a control unit for heating and ventilation, and further electronic components and cable connections. The vehicle communication controller 11 is connected to the CAN bus 13 of a car, which is not shown in FIG. 1.

The vehicle communication controller 11 comprises a UCM unit 14 that provides a unified communication mechanism (UCM), a RM unit 15 that provides a remote messaging interface (RMI), an ICC unit 16 that provides inter CPU communication (ICC), and an SP unit 17 that provides a serial peripheral interface (SPI).

Likewise, the main controller 12 comprises an SP unit 27 for providing a serial peripheral interface, an ICC unit 26 for providing an inter CPU communication and a RM unit 25 that provides a remote messaging interface. Furthermore, the main controller 12 comprise a vehicle sensor driver 18 and an early business logic (BL) driver 19 for providing back light at an early time.

The SP unit 27, the ICC unit 26, the RM unit 25, the vehicle sensor driver 18 and the early BL driver 19 are located in a kernel space 20 of the main controller 12, or, in other words, they run in a kernel mode. In the kernel mode, a CPU may perform any operation allowed by its architecture; any instruction may be executed, any I/O operation initiated, any area of memory accessed, and so on. In the other CPU modes, certain restrictions on CPU operations are enforced by the hardware. A processor starts up in kernel mode and runs a boot loader in kernel mode. The operating system is loaded and, it too, runs in kernel mode. The processes that it launches usually run in user mode.

The main controller 12 provides a user space 21 for programs that run in a user mode. This applies, for example, to graphics and video display routines and most other processes that run after the operating system has fully booted.

FIG. 1 also shows a data flow 22 from the CAN bus 13 to the vehicle communication controller 11 and from the vehicle communication controller 11 to the main controller 12. The data flow 22 extends from the CAN unit 13 over the UCM unit 14, the RM unit 15, the ICC unit 16 and the SP unit 17 of the vehicle communication controller to the SP unit 27 of the main controller 12 and over the ICC unit 25 and the RM unit 25 of the main controller 12.

Furthermore, a data flow 23 for messages extends from the RM unit 15 of the vehicle communication controller 11 to the RM unit 25 of the main controller 12, a bidirectional data flow 24 extends between the ICC unit 16 of the vehicle communication controller 11 and the ICC unit 26 of the main controller 12. The bidirectional data flow 24 transports data frame messages from the ICC unit 16 of the vehicle communication controller 11 to the ICC unit 26 of the main controller 12, and it transports acknowledgement frames from the ICC unit 26 of the main controller 12 to the ICC unit 16 of the vehicle communication controller 11.

A further bidirectional data flow 30 extends between the vehicle sensor driver 18 and the early business logic driver 19 of the main controller 12.

FIG. 2 shows a further view of a general layout of the infotainment system 10 of FIG. 1.

In the example of FIG. 2, the infotainment system 10 comprises a vehicle communication controller (VCU) 31 and a multimedia controller (MMU) 32. The vehicle communication controller 31 of FIG. 2 corresponds to the vehicle communication controller 11 of FIG. 1 and the multimedia controller 32 of FIG. 2 corresponds to the main controller 12 of FIG. 1.

By way of example, the vehicle communication controller 31 may be provided by a processor of the Texas Instruments product family "TI TMS 470" and the multimedia controller may be provided by a multimedia controller of the product family "i.MX 53" of freescale semiconductors. The multimedia controller 32 comprises a first microcontroller unit (MCU) for handling system functions, CAN communication and other service functions, which is also referred to as "platform" and a second microcontroller unit for handling graphics functions.

In other embodiments, the multimedia controller 32 may also comprise several MCUs for handling graphics functions, such as an image processing unit, a video processing unit, a 3D graphics processing unit and a 2D graphics processing unit. The multimedia controller 32 is connected to peripheral devices 60 such as a DDR RAM, a LDC display, a camera, a CVBS/S video component, a GPS system, or an audio power management system. Furthermore, the multimedia controller 32 is connected to a NOR flash memory 59, which contains a flashable image with an image header. The NOR flash memory may be on the multimedia controller 32, as shown in FIG. 2, or external to it.

The vehicle communication controller 31 comprises a rear view camera (RVC) unit 33, which is connected to a low-speed CAN unit 34, a remote messaging interface unit 35 and a vehicle RB unit 36. The RVC unit 33 provides business logic (BL) for a rear view camera of the car.

The multimedia controller 32 comprises, in a RAM memory, a first kernel mode shared library 37 and a second kernel mode shared library 38. The kernel mode library comprises a splash screen shared library 58. The first shared library 37 comprises a RMI receiver module 39, a touch screen driver 40 and a back light thread 41. The RMI receiver module 39 comprises an input port, which is connected to an output port of a RMI unit 42 of the multimedia controller 32.

Furthermore, the multimedia controller 32 comprises a human machine interface unit 42, a remote message interface unit 43, a CAN driver 44, a platform 45 with a registry handling module 46 and a graphics module 47, a hardware interrupt handling module 48, and a low-voltage differential signalling (LVDS) module 49. The CAN driver 44 is provided for reading and writing CAN signals.

A first data flow of the multimedia controller 32, which is used to activate a display back light, extends from the remote message interface of the multimedia controller 32 via the RMI receiver module 39, the back light thread 41 the touch screen driver to the CAN driver 44.

A second data flow of the multimedia controller 32, which is used to display a splash screen image, extends from the human machine interface 42 over the splash screen shared library of the second kernel mode shared library 38, to the display handling module 46 and the graphics module 47 of the platform 45 and from the graphics module 47 to the hardware interrupt handling module 48 and the LVDS module 49.

The display handling module 46 is provided for reading a splash screen calibration and for saving a currently displayed splash screen. The graphics module 47 is provided for performing a graphic hardware initialization, for retrieving a frame buffer address and for drawing the splash screen image on the display screen.

A shared library or shared object refers to a file that is intended to be shared by executable files and further shared objects files. Modules used by a program are loaded from individual shared objects into memory at load time or run time, rather than being copied by a linker when it creates a single monolithic executable file for the program. In particular, the shared library may be provided by a dynamically linked library, also referred to as a "DLL" in the context of the Microsoft Windows operating system.

FIG. 3 shows a time sequence during a system start-up of the infotainment system 10 of FIG. 1. During system start up, the vehicle processor 31 spends a time $\Delta t1$ for a CAN bus wake-up, a time $\Delta t2$ to turn on a power management IC (PMIC), and a time $\Delta t3$ until the vehicle processor 31 receives a first message from a bootstrap power supply of the PMIC. The multimedia processor 32 spends a time $\Delta t4$ until the OS starts running, a time $\Delta t5$ until it receives a first message from the remote messaging interface and a time $\Delta t6$ for turning the back light of the display on.

Furthermore, the multimedia processor spends a time $\Delta t7$ for loading the graphics library "Gwes.dll", which is the graphics, windowing and event subsystem library of a Windows Embedded operating system, a time $\Delta t8$ until an early backlight (EBL) routine receives a message from the remote messaging interface to turn on an audio/video receiver (AVR), a time $\Delta t9$ for a VHR to turn on the AVR, and a time $\Delta t10$ for receiving the first video capture event from the RMI.

According to a first aspect of the present specification, a rear camera video is displayed already after the backlight is activated without the need to load a graphic library or a video handler of the operating system first by providing a standalone solution, which is independent from the normal drawing.

According to a second aspect of the resent specification, a rear camera video display is handed over from a first kernel mode driver, which uses basic operating system calls, to a second driver using a standard video rendering library of the operating system.

According to a third aspect of the present specification, a back light is turned on early such that a splash screen image can be displayed early.

According to the third aspect of the present specification the LCD back is turned on early during a start-up procedure of the infotainment system 10. In order to allow a multimedia controller (MMU) to decide when to turn on the back light, a power state, which is handled by the vehicle communication controller (VUC), is passed to the multimedia controller.

According to the present specification, a remote messaging (RMI) protocol is used to achieve an early transfer of the power state to the MMU from the VUC.

Normally, the communication between the vehicle communication controller 31 and the multimedia controller 32 of FIG. 2 is carried out using a bidirectional communication protocol such as the MOST protocol, which requires some handshaking synchronization before starting the bidirectional communication.

Furthermore, the required MOST software modules are big and require some time to load during boot-up.

By contrast, according to the present specification the required information to show a splash screen logo, which is an event to turn on back light, is transferred from the vehicle communication controller 31 to the multimedia controller 32. The triggering of the event to turn on the back light is dependent on a power module, which is also executed by the vehicle communication controller 31.

Therefore, the event to turn on the back light can be triggered without the need of a two-way communication between the vehicle communication controller 31 and the multimedia controller 32. According to the present specification, a customized tiny one-way communication protocol is used, which is implemented by the components 35, 43 and 39 shown in FIG. 2. The one-way communication protocol is provided for sending messages from the vehicle communication controller 31 to the multimedia controller 32.

In the context of the present specification, this one-way protocol is also referred to as remote messaging interface (RMI) protocol. The RMI protocol according to the present specification can be used for a time and resource efficient transfer of further messages and events as well.

FIG. 4 shows a message format of a remote messaging interface protocol. The Remote Messaging Interface (RMI) protocol in is used by the vehicle communication controller (TI) side to transfer critical data such as Vehicle Speed, Wheel Pulse, Gear Signal, Fmux eject, etc. via the CAN bus to multimedia processor 32 in a periodic manner. The RMI message format is built on top of an interchip communication (ICC) message format. The communication between the two controllers 31, 32 is always unidirectional whereby the vehicle communication controller 31 will always act as transmitter. The RMI protocol runs in parallel with the MOST protocol.

According to a first RMI message format, which is shown in the topmost and in the third row of FIG. 4, a message comprises a tag with a fixed length of length 1 byte, a length specifier with a fixed length of length 1 byte and a payload segment of n-bytes, the number n of bytes being specified in the length specifier.

According to a second message format, the message comprises only a tag and a fixed length value, according to a third format, the message comprises only a tag. Thus, the length and value fields are optional. The messages according to the first format can also be appended or concatenated to each other, as shown in the bottom position of FIG. 4. Likewise, messages according to the first, second or third message format can be concatenated.

Furthermore, the messages can be packaged according to a higher level communication protocol, such as the interchip communication protocol or the CAN protocol as shown in the second row of FIG. 4.

According to the present specification, a mechanism is provided to keep track of messages of the RMI protocol. The rear view camera is one of the safety critical features. Therefore, it is very important that the architecture provides a mechanism to avoid the loss of any message due to communication or message passing across different software components.

According to the application, a mechanism is provided, which is adapted to the one-way RMI protocol of the current specification, which is different from the approach of the two-way MOST protocol, which uses acknowledgement messages.

According to one embodiment, an event is sent periodically using a suitable period that takes into account the loading process of the CPU of the multimedia controller 32. This embodiment is shown in FIG. 5.

A first mailbox 66 for collecting messages is provided in a communication path from a CAN application 65 to a RVC trigger business logic 67, which handles events that trigger a RVC display, such as a gear change. A second mailbox 68 for collecting messages is provided in a communication path between the back light trigger 67 and a RMI dispatcher module for dispatching RMI messages to recipients.

During operation, messages are sent periodically from the CAN application 65 to the first mailbox 66, from the first mailbox 66 to the back light trigger, from the back light trigger to the second mail box 67 and from the second mail box 67 to the RMI dispatcher 69. The method steps of FIG. 5 are executed on the vehicle communication controller 31 and the CAN application 65, the first mailbox 67 and the RMI dispatcher reside on the vehicle communication controller 31.

According to FIGS. 6 to 9 of the present specification, a mechanism is provided to show pictures from a rear view camera in a boot phase 2, after a boot phase 1 of the operating system. Before the RVC application is ready, certain graphics drivers, such as the direct draw drivers (DDRAW) of the windows operating system may not yet be loaded. The functions of those drivers are therefore not available to the early business logic. The RVC application and the HMI application, on the other hand, make use of the available graphics libraries and can provide an extended functionality.

According to the present specification, a video driver for displaying images of a rear view camera is made available before a rear view camera application is ready. The rear view camera is a safety critical feature. Displaying the rear view camera videos at an early time and before other components are loaded, provides enhanced safety and user comfort.

On the other hand, certain features, such as a parking aid and user interaction functions can only be provided at a later time during the later boot phase when graphics libraries of the operating system, such as the DirectDraw interface, and the human machine interface are available.

According to the application, a layered infrastructure is provided, whereby the video library is called by an early phase software layer, which provides fewer functions to the user, during an earlier boot phase of the operating system.

During a later time in the boot process, the functions of the video library are invoked by a software layer with more features, such as the RVC application or the HMI application. In this way, the video driver can provide function calls, which only work at a later time during the boot process, such as the parking grid. These functions are not called by the early business logic but only by RVC application or by the HMI application.

The parking grid aids the driver in driving into or out of a parking gap by indicating distance signals and suggested driving directions. In particular, the HMI application allows to display the parking grid in an interactive mode. According to one embodiment, the parking grid is already available by the RVC application and according to another embodiment it is only available at a time when the HMI application is loaded.

In the example of FIGS. 6 to 9, an earlier phase software layer is provided by the early business logic kernel mode driver, which is loaded in step 70. A later phase software layer is provided by the rear view camera application that is loaded in step 81 and the human machine interface application that is loaded in step 78'.

Furthermore, a mechanism is provided to hand over control of the video driver from the early phase software layer to the later phase software layer. This is best seen in FIG. 9

In particular, the boot phases of Windows CE7 are characterized by the following features. Windows CE7 goes through two boot phases during startup. During the first boot phase, the system loads the kernel with minimum drivers to access the device's file system and to access registry data. After the registry data is read, the system continues with the second boot phase to load the remaining components based on registry configuration data.

In a step 70 of FIG. 6, a kernel mode driver is provided and is loaded in boot phase 1 of the operating system. In a step 71, an initialization function spawns a thread, which is waiting for a RMI event message of the RVC state in a step 72.

In a decision step 73 it is detected whether a video driver is loaded, for example based on a corresponding registry value or file value. If the event is received before a video driver is ready, the rear view camera state data is updated in a step and no video capture is started. Eventually, video capture is started in boot phase 2 as a result of the video driver initialization in a step 75. This process is described in more detail with respect to FIG. 8.

If, in the decision step 72, the event is received and a video driver is ready or loaded, the control is transferred to the video driver. This situation is shown in FIG. 7. For simplicity, a step of loading the video driver into a kernel space during the first boot phase is not shown in FIG. 7.

In the example of FIG. 7, a RMI event is received in a step 76. In this case, the RMI event, which is sent according to the one-way RMI protocol, indicates that a gear has been changed from a parking position to a reverse gear position. In the decision step 73, it is checked if the video driver is loaded, if the video driver is loaded, the video display is started in a step 85. In the boot phase 2, the control is transferred to the same video driver in steps 75 and 76.

The video driver is loaded in a boot phase 2. An initialization function "Init( )" of the video driver checks the RVC state.

FIG. 8 shows a sequence of steps leading to a video capturing of images from the rear view camera. For the sake of brevity, steps which are identical those in FIG. 6 are not explained again. In a step 76 in the boot phase 2, a user mode video driver is loaded as first driver. The video driver comprises a thread to start the video display with a priority that is above normal to achieve fast timing to trigger the video start.

The starting of the video display comprises the step 78 of starting video capture, the step 79 of setting the video layer visible and the step 80 of displaying the video signals on the video display.

In step 75, an initialization function "Init( )" of the video driver checks for the RVC state and triggers a video start if the RVC state is set. The loading of other drivers is delayed until the "Init( )" has function completed. Thereby, a CPU load of the multimedia processor 32 is reduced and there is little or no interruption for the start of the video display.

FIG. 9 shows a handover following the sequence of FIG. 7. When the HMI process of the system is ready and a standard RVC application, or a video driver, is available or loaded in step 73, the control is transferred from the Early BL video driver to the RVC business logic in steps 81, 82, 83, 78', 79', 80'. In particular, a rear view camera application is loaded in a step 81, an audio-video process is loaded in a step 82. The rear view camera application loads an HMI application in step 78' and the HMI application loads an HMI process in step 83. In a step 79', an HMI layer is set to visible and in step 80, video data is displayed on the video display. The step 80 may also include a step 84 of displaying a parking grid.

According to the embodiment of FIG. 9, the same video driver is used by the early business logic and by the RVC application, which simplifies the handover task.

The rear view camera application is loaded during the second boot phase in step 81. When the RVC application is ready it informs the Early business logic (BL) that it is ready. At this point of time, the communication from the Early BL to video driver is discontinued in step 85 and further RVC states and control is forwarded to the RVC business logic instead of being sent directly to the video driver in steps 85' and 81.

The RVC business logic provides a software layer for handling the video driver and other functions related to the rear view camera. A further software layer is provided by the HM interface, which makes the calls to the RVC business logic dependent on the user interaction.

FIG. 10 shows a passenger compartment 90 of a car. In the middle console, an infotainment system 10 is provided, which comprises a display 91 and a CD drive 92. An HVAC system 93 is provided above the infotainment system. In a further embodiment, the HVAC system 93 can be controlled from the display 91 of the infotainment system.

The embodiments can also be described with the following lists of features or elements being organized into an item list. The respective combinations of features, which are disclosed in the item list, are regarded as independent subject matter, respectively, that can also be combined with other features of the application.

1. An infotainment assembly for a car, comprising
   a vehicle communication controller, the vehicle communication controller comprising
      a bus connection for connecting a serial bus,
      a message processing unit, and a remote messaging interface for sending messages using a one-way protocol, and a multimedia controller that is connected to the vehicle communication controller via an interchip communication bus, the multimedia controller comprising a display connection for connecting a display, a message receiver for receiving messages of the one-way protocol, a computer readable memory with an operating system, the operating system comprising multiple boot phases, a video driver for displaying rear view camera images, and an early business logic which is operative to cause the video driver to start a rear view camera video, wherein the operating system is configured to load the early business logic during an earlier boot phase of the operating system and to load the vide driver in a later boot phase of the operating system, the earlier boot phase preceding the later boot phase.

2. The infotainment assembly according to item 1, wherein the early business logic driver is operative to wait for a gear change event from the vehicle communication controller via the one-way protocol, to detect whether the video driver is loaded at the time when the gear change event is received, and to activate the video driver if it is loaded.

3. The infotainment assembly according to item 2, wherein the gear change event indicates a gear change from a park position to a reverse gear position or a gear change from a neutral position to a reverse gear position.

4. The infotainment assembly according to any of the items 1 to 3, wherein the multimedia controller comprises a rear view camera application/business logic for calling the video driver in the later boot phase, and a handover unit which is operative to receive a message which indicates that the rear view camera application is ready and to discontinue communication between the early business logic and the video driver and to establish communication between the rear view camera application and the video driver.

5. The infotainment assembly according to any of the items 1 to 4, wherein the vehicle communication controller comprises a CAN application for sending CAN messages in periodic intervals, and a CAN message mailbox unit for storing messages of the CAN application and for sending a feedback message indicating whether the CAN message mailbox unit is full, wherein the CAN application is operative to retry sending a message if it receives a feedback message indication that the CAN message mailbox is full.

6. The infotainment assembly according to any of the items 1 to 5, wherein the message processing unit is operative to evaluate CAN messages and to trigger rear view camera events, the vehicle communication controller comprising an event messages mailbox unit for storing event messages of the message processing unit of item 1 and for sending a feedback message indicating whether the mailbox unit is full, wherein the rear view camera trigger business logic is operative to retry sending a message if it receives a feedback message indication that the event messages mailbox is full.

7. The infotainment assembly according to item 6, comprising a message dispatcher for sending event messages from the vehicle communication controller to the multimedia controller via a one-way protocol, the message dispatcher unit being connected to an output of the event messages mailbox.

8. An infotainment system of a car, comprising an infotainment assembly according to any of the items 1 to 7, the infotainment system comprising a display device with a display screen, the display device being connected to the display connection of the multimedia controller.

9. A car with an infotainment system according to item 8, wherein a CAN bus of the car is connected to the bus connection of the vehicle communication controller.

10. A method for displaying video images from a rear view camera on a screen of a display device of a car infotainment system, the multimedia controller comprising an operating system with multiple boot phases, the method comprising loading an early business logic driver in a kernel space of the operating system, waiting for a rear view camera state event from a vehicle communication controller, determining if a kernel mode video driver is loaded, if the kernel mode video driver is not loaded, updating a rear view camera state flag, if the kernel mode video driver is loaded, and calling a function of the kernel mode video driver for retrieving and displaying rear view camera video images.

11. A method for handing over control of a video driver from a kernel mode early business logic to a rear view camera application during a later boot phase of an operating system with multiple boot phases, the method comprising waiting for an event indicating that a rear view camera business logic is ready, loading a rear view camera application into a user space of the operating system, discontinuing a communication between the video driver and the early business logic application, and establishing a communication between the rear view camera application and the kernel space video driver.

12. A method for generating rear view camera events from CAN messages comprising filtering the CAN messages for rear view camera messages, generating rear view camera events from the filtered CAN messages, storing the rear view camera events in a mailbox, sending a feedback message if the mailbox is full, and resending a rear view camera event upon receiving a feedback message indicating that the mailbox is full.

13. The method of item 12, comprising sending the rear view camera events via a one-way protocol.

| | Reference list |
|---|---|
| 9 | vehicle electronics |
| 10 | infotainment system |
| 11 | vehicle communication controller |
| 12 | main controller |
| 13 | CAN bus |
| 14 | UCM unit |
| 15 | RM unit |
| 16 | ICC unit |
| 17 | SP unit |
| 18 | vehicle sensor driver |
| 19 | early BL driver |
| 20 | kernel space |

-continued

| Reference list | |
|---|---|
| 22 | data flow |
| 23 | data flow |
| 24 | bidirectional data flow |
| 25 | RM unit |
| 26 | ICC unit |
| 27 | SP unit |
| 30 | bidirectional data flow |
| 31 | vehicle communication controller |
| 32 | multimedia controller |
| 33 | rear view camera unit |
| 34 | low speed CAN unit |
| 35 | RMI unit |
| 36 | vehicle RB unit |
| 37 | kernel mode shared library |
| 38 | kernel mode shared library |
| 39 | RMI receiver module |
| 40 | touch screen driver |
| 41 | back light thread |
| 42 | RMI unit |
| 43 | RMI unit |
| 44 | CAN driver |
| 45 | platform |
| 46 | registry handling module |
| 47 | graphics module |
| 48 | hardware interrupt handling module |
| 49 | low voltage differential signalling module |
| 50 | image |
| 51 | step |
| 52 | combining step |
| 53 | saving step |
| 58 | splash screen shared library |
| 59 | NOR flash memory |
| 60 | peripheral devices |
| 60' | peripheral devices |
| 61 | rear view camera |
| 65 | CAN application |
| 66 | first mail box |
| 67 | RVC trigger |
| 68 | second mail box |
| 69 | RMI dispatcher |
| 70 | driver loading step |
| 71 | Early BL init step |
| 72 | RMI waiting step |
| 73 | decision step |
| 74 | RVC state update step |
| 74' | RVC state update step |
| 75 | video driver init step |
| 76 | video driver load step |
| 77 | RMI event step |
| 78 | video capturing step |
| 78' | HMI loading step |
| 79 | set layer visibility step |
| 79' | set layer visibility step |
| 80, 80' | display step |
| 81 | load RVC app step |
| 82 | load AV proc step |
| 83 | load HMI process step |
| 84 | parking grid display step |
| 85 | video start step |
| 85' | video start step |
| 90 | passenger compartment |
| 91 | display |
| 92 | CD drive |
| 93 | HVAC system |

The invention claimed is:

1. An infotainment assembly for a car, comprising
a vehicle communication controller, the vehicle communication controller comprising
a bus connection for connecting a serial bus,
a message processing unit, and
a remote messaging interface for sending messages using a one-way protocol, and
a multimedia controller that is connected to the vehicle communication controller via an interchip communication bus, the multimedia controller comprising
a display connection for connecting a display,
a message receiver for receiving messages of the one-way protocol,
a computer readable memory with an operating system, the operating system comprising multiple boot phases,
a video driver for displaying rear view camera images, and
an early business logic which is operative to cause the video driver to start a rear view camera video,
wherein the operating system is configured to load the early business logic during an earlier boot phase of the operating system and to load the video driver in a later boot phase of the operating system, the earlier boot phase preceding the later boot phase.

2. The infotainment assembly according to claim 1, wherein the early business logic driver is operative to wait for a gear change event from the vehicle communication controller via the one-way protocol, to detect whether the video driver is loaded at the time when the gear change event is received, and to activate the video driver if it is loaded.

3. The infotainment assembly according to claim 2, wherein the gear change event indicates a gear change from a park position to a reverse gear position or a gear change from a neutral position to a reverse gear position.

4. The infotainment assembly according to claim 3, wherein the multimedia controller comprises
a rear view camera application/business logic for calling the video driver in the later boot phase, and
a handover unit which is operative to receive a message which indicates that the rear view camera application is ready and to discontinue communication between the early business logic and the video driver and to establish communication between the rear view camera application and the video driver.

5. The infotainment assembly according to claim 4, wherein the vehicle communication controller comprises
a CAN application for sending CAN messages in periodic intervals, and
a CAN message mailbox unit for storing messages of the CAN application and for sending a feedback message indicating whether the CAN message mailbox unit is full,
wherein the CAN application is operative to retry sending a message if it receives a feedback message indication that the CAN message mailbox is full.

6. The infotainment assembly according to claim 5, wherein the message processing unit is operative to evaluate CAN messages and to trigger rear view camera events,
the vehicle communication controller comprising
an event messages mailbox unit for storing event messages of the message processing unit and for sending a feedback message indicating whether the mailbox unit is full,
wherein the rear view camera trigger business logic is operative to retry sending a message if it receives a feedback message indication that the event messages mailbox is full.

7. The infotainment assembly according to claim 6, comprising a message dispatcher for sending event messages from the vehicle communication controller to the multimedia controller via a one-way protocol, the message dispatcher unit being connected to an output of the event messages mailbox.

8. The infotainment assembly according to claim 7, further comprising a display device with a display screen, the display device being connected to the display connection of the multimedia controller.

9. The infotainment assembly according to claim 8, wherein a CAN bus of the car is connected to the bus connection of the vehicle communication controller.

10. The infotainment assembly according to claim 1, wherein the multimedia controller comprises
a rear view camera application/business logic for calling the video driver in the later boot phase, and
a handover unit which is operative to receive a message which indicates that the rear view camera application is ready and to discontinue communication between the early business logic and the video driver and to establish communication between the rear view camera application and the video driver.

11. The infotainment assembly according to claim 1, wherein the vehicle communication controller comprises
a CAN application for sending CAN messages in periodic intervals, and
a CAN message mailbox unit for storing messages of the CAN application and for sending a feedback message indicating whether the CAN message mailbox unit is full,
wherein the CAN application is operative to retry sending a message if it receives a feedback message indication that the CAN message mailbox is full.

12. The infotainment assembly according to claim 1, wherein the message processing unit is operative to evaluate CAN messages and to trigger rear view camera events,
the vehicle communication controller comprising
an event messages mailbox unit for storing event messages of the message processing unit and for sending a feedback message indicating whether the mailbox unit is full,
wherein the rear view camera trigger business logic is operative to retry sending a message if it receives a feedback message indication that the event messages mailbox is full.

13. The infotainment assembly according to claim 12, comprising a message dispatcher for sending event messages from the vehicle communication controller to the multimedia controller via a one-way protocol, the message dispatcher unit being connected to an output of the event messages mailbox.

14. The infotainment assembly according to claim 1 further comprising a display device with a display screen, the display device being connected to the display connection of the multimedia controller.

15. The infotainment assembly according to claim 14, wherein a CAN bus of the car is connected to the bus connection of the vehicle communication controller.

16. A method for displaying video images from a rear view camera on a screen of a display device of a car infotainment system, the multimedia controller comprising an operating system with multiple boot phases, the method comprising
loading an early business logic driver in a kernel space of the operating system,
waiting for a rear view camera state event from a vehicle communication controller,
determining if a kernel mode video driver is loaded,
if the kernel mode video driver is not loaded,
updating a rear view camera state flag, and
if the kernel mode video driver is loaded,
calling a function of the kernel mode video driver for retrieving and displaying rear view camera video images.

17. A method for handing over control of a video driver from a kernel mode early business logic to a rear view camera application during a later boot phase of an operating system with multiple boot phases, the method comprising
waiting for an event indicating that a rear view camera business logic is ready,
loading a rear view camera application into a user space of the operating system,
discontinuing a communication between the video driver and the early business logic application, and
establishing a communication between the rear view camera application and the kernel space video driver.

18. A method for generating rear view camera events from CAN messages comprising
filtering the CAN messages for rear view camera messages,
generating rear view camera events from the filtered CAN messages,
storing the rear view camera events in a mailbox,
sending a feedback message if the mailbox is full, and
resending a rear view camera event upon receiving a feedback message indicating that the mailbox is full.

19. The method of claim 18, comprising sending the rear view camera events via a one-way protocol.

* * * * *